United States Patent [19]

Eriksson

[11] 3,969,141

[45] July 13, 1976

[54] POWDER MIXTURE FOR PRODUCTION OF LEAD STORAGE BATTERY ELECTRODES AND METHOD

[75] Inventor: Tore Eriksson, Nol, Sweden

[73] Assignee: Aktiebolaget Tudor, Sundbyberg, Sweden

[22] Filed: Nov. 1, 1974

[21] Appl. No.: 520,123

[30] Foreign Application Priority Data
Nov. 1, 1973 Sweden .............................. 7314902

[52] U.S. Cl. .................................. 136/26; 136/27; 136/67; 106/297
[51] Int. Cl.² .......................................... H01M 4/36
[58] Field of Search ...................... 136/26, 27, 67; 106/297

[56] References Cited
UNITED STATES PATENTS

| | | |
|---|---|---|
| 668,356 | 2/1901 | Placet .................................. 136/26 |
| 900,898 | 10/1908 | Thiellet et al .......................... 136/26 |
| 938,312 | 10/1909 | Gardiner ................................ 136/26 |
| 1,105,499 | 7/1914 | Drambourg ............................ 136/26 |
| 1,536,064 | 5/1925 | Benner et al. ......................... 136/67 |
| 2,866,840 | 12/1958 | Dittmann et al. ....................... 136/26 |
| 2,938,063 | 5/1960 | Greenburg et al ...................... 136/26 |
| 3,124,486 | 3/1964 | Malloy .............................. 136/26 X |
| 3,607,408 | 9/1971 | Duddy .................................... 136/26 |
| 3,702,265 | 11/1972 | Snyder et al ........................... 136/26 |
| 3,809,579 | 5/1974 | Venutto ................................ 136/26 |

*Primary Examiner*—Howard S. Williams
*Assistant Examiner*—C. F. LeFevour
*Attorney, Agent, or Firm*—Burns, Doane, Swecker & Mathis

[57] ABSTRACT

A powder mixture for the production of lead storage battery electrodes contains lead, lead oxide, and an oxide or salt of a metal which is very slightly soluble in alkaline solution, but forms a readily soluble sulfate in the presence of sulfuric acid.

16 Claims, No Drawings

POWDER MIXTURE FOR PRODUCTION OF LEAD STORAGE BATTERY ELECTRODES AND METHOD

The present invention relates to a powder mixture intended to constitute the active material in lead storage battery electrodes.

A lead storage battery electrode consists mainly of electric conductors and active material, and possibly a sheath that surrounds the electrode and holds the active material firmly. Electrodes with such sheaths are used primarily as positive electrodes. The active material in negative electrodes consists of lead sponge, and the positive electrodes comprise lead oxides, primarily lead dioxide. This is converted in discharge of the battery to lead sulfate. In the production of storage battery electrodes, a finely divided material is prepared consisting of lead and lead oxides, which is the starting material for the active material in both the positive and the negative electrodes. In the finished electrode, the porosity of the active material must be great, while the individual particles must be in mutual contact so that the electrode will have satisfactory mechanical and electrical properties. Thus far, positive electrodes have been made with a porosity up to no more than about 60% by volume. To obtain the desired porosity, various additions to the active material have been utilized. For example, it is known that very finely divided silicon dioxide can be added. Maximally, however, the additions have amounted to only a few per cent of the total amount, and in general it has been a matter of about tenths of a percent of the amount of the lead. Larger additions have been shown to result in poor contact within the active material, with a low degree of efficiency and poor mechanical properties as a result. It is desirable, especially in positive electrodes, to obtain greater porosity than what has thus far been attainable. To have a favorable $H_2SO_4$ — $PbO_2$ relationship, the free volume should be 75 to 80% of the total volume and consist of pores that can be filled with electrolyte. There also remains the requirement for a coherent strong structure for the active material.

Accordingly, a primary object of the present invention is to provide a powder mixture and a lead storage battery produced therefrom which has a greater porosity than hitherto obtainable.

Another object is to provide such a powder mixture and an electrode produced therefrom having a coherent, strong, porous structure.

Still another object is to provide a powder mixture and an electrode produced therefrom in which from about 75 to 80% of the volume is free to be filled with electrolyte, or, stated differently, in which the lead-lead oxide mixture occupies no more than 20–25% of the total volume.

These and other objects, which will be apparent to those skilled in the art are, in general, achieved in accordance with the present invention by adding to the lead-lead oxide powder mixture a compound which is capable of being dissolved from the mixture after the electrode has been formed.

More particularly, the foregoing objects are achieved by adding to the powder mixture an oxide or salt of a metal, which oxide or salt is very slightly soluble in alkaline solution, but forms a readily soluble sulfate in the presence of sulfuric acid.

Merely as guidelines, "very slightly soluble" is considered to mean that, at most, 0.1 gram of the compound will dissolve in 100 cc of liquid, whereas "readily soluble" will be considered to mean a solubility of at least 1 gram of the sulfate in 100 cc of liquid.

Without being bound by the correctness of the expressed reasons for the results obtained in accordance with the present invention, the fact that large amounts of oxides or salts can be added may be explained in the following manner:

In the production of so-called positive "tubular electrodes," for example, the tube sheath is first placed over the electric conductors, after which the active material, e.g., a lead-lead oxide powder mixture, is supplied in dry form. This is followed by a "forming" step. Forming is an initial charging of the electrode, whereby the active material is almost completely converted to lead dioxide. This forming is generally done in relatively low concentration sulfuric acid. It may, however, be done also in another acid or alkaline electrolyte. No matter what the electrolyte that is selected, there is formation of certain complex ions, primarily a hydroxide complex containing lead which goes into solution in the liquid in the interior of the active material. As a result, there is formed inside in the electrodes an alkaline medium, independently of the outer electrolyte. During the forming process, there is then a balancing between the inner and the outer electrolyte, and since the outer electrolyte is in great excess, the inner electrolyte gradually assumes the same composition as the outer. The processes that occur in the initial stage of the forming step when the inner electrolyte is alkaline are, however, of decisive importance for the structure that is obtained in the active material, and for its contact with the electric conductors. The filler material in the form of a metallic compound added to the powder mixture to get greater porosity must therefore be essentially insoluble in the alkaline medium, and, at least in the initial stage, it must be present in solid particles that support the active material in this buildup stage. It is the volume occupied by the metallic compound which will later be accessible to the electrolyte. Since the electrolyte that is used in storage batteries is sulfuric acid, the metallic compound therefore must form a readily soluble sulfate in the presence of sulfuric acid. The requirement that must be set as to the very slight solubility of the metallic compound in alkaline solution and its ready solubility as the sulfate can be varied somewhat, depending upon other circumstances, as will be appreciated by those skilled in the art. Since it can be difficult to effect complete removal of the compound that is added, it must not contain anything that could be damaging to the battery in its future use. As suitable metallic compounds there may be mentioned, for example, magnesium oxide (MgO), magnesium carbonate ($MgCO_3$), magnesium phosphate ($Mg_3(PO_4)_2$), and magnesium phosphate ($MgHPO_4$). These, as well as certain salts or compounds of other metals, meet the above requirement.

It has been found that magnesium oxide is especially suitable as an additive to the lead-lead oxide powder mixture. However, magnesium oxide comes in many different grades which are primarily distinguished by their differing bulk density. It has been found that too low a bulk density is unsuitable, obviously, because of the supporting function in the buildup stage of the active material which the compound is assumed to have. Thus, for example, concerning magnesium oxide that is available in bulk densities down to 0.1 kg/dm$^3$, acceptable results are attained when the bulk density is at least 0.2 kg/dm$^3$. Preferably, however, best results are attained when the bulk density is more than 0.8 kg/dm$^3$.

Volume changes in the active material, may cause unwanted effects that can seriously shorten the life of the electrode. These volume changes occur when the dry active material is immersed in a liquid for formation or pretreatment for formation. Also they occur in the formation step and are due to transfer of the sulphates and other compounds in the active material, to a charged condition. Normally the effect shows up as cracks in the active material, which breaks the electrical contact between different parts of this material. These effects can be specially serious in highly porous active material, resulting from powder mixes according to the invention. Now it has been found that it is possible to make compositions which are on the whole isovolumetric, that is their volume changes little or not at all in the different steps. This is obtained by adding to the lead compounds, not only one of the compounds mentioned above, but at least two. Magnesium sulphate has turned out to be especially effective in this respect and due to the composition of the rest of the active material, an addition of 0.1 to 5% of magnesium sulphate calculated as weight percent of the total amount should be made. Preferably the amounts of magnesium sulphate should be 1 or 2% of the total weight. In experiments with addition of 10% of nonlead compounds of the active material, it has been found that compositions containing 1% magnesium sulphate and 9% magnesium oxide and also 2% magnesium sulphate and 3% magnesium oxide, give the wanted result. However, one has to be careful not to add too much of the sulphates and the addition of 5% magnesium sulphate only to the active material, caused a swelling which lead to a total loss of contact between the active material and the electrical conductor.

A preferred form of the invention is illustrated in the following example:

A powder mixture was made consisting of 3 parts of finely powdered lead, 7 parts of finely powdered lead oxide, and 2 parts of magnesium oxide having a bulk density of about 0.8 kg/dm$^3$. The stated amount of magnesium oxide was sufficient to comprise about 15% by weight of the total mixture. A positive electrode was made from this mixture and formed in the usual manner known to those skilled in the art by charging it in a low concentration of sulfuric acid. The formed electrode had a porosity of about 75% with excellent electrical properties.

Similar results can be obtained using magnesium carbonate and the two magnesium phosphates mentioned above.

It will be apparent to those skilled in the art that the compounds specifically mentioned above are merely illustrations and are not to be construed as limitations on the scope of the disclosed invention, but, rather, that the scope of the invention is as defined in the claims which follow.

What is claimed is:

1. An isovolumetric powder mixture for the production of tubular lead storage battery electrodes comprising a mixture of lead and lead oxide as the active material and at least two non-lead additive compounds, one of said compounds comprising an oxide or salt of a metal, said compound being very slightly soluble in alkaline solution and being capable of reacting with sulfuric acid to produce a readily soluble sulfate.

2. An isovolumetric powder mixture for the production of tubular lead storage battery electrodes, said mixture comprising particles of lead, lead oxide, and at least two non-lead additive compounds, one of said additive compounds being magnesium sulfate and at least one of the remaining of said additive compounds comprising an oxide or a salt of a metal, said oxide or salt being very slightly soluble in alkaline solution, but being capable of reacting with sulfuric acid to produce a readily soluble sulfate.

3. A powder mixture as in claim 2, wherein the lead and lead oxide particles occupy about 20–25% of the total volume of the mixture.

4. A powder mixture as in claim 2 wherein the combined additives comprise about 15% of the total weight of the mixture.

5. A powder mixture as in claim 2 wherein the alkali-insoluble compound is a member of the group consisting of magnesium oxide (MgO), magnesium carbonate (MgCO$_3$), magnesium phosphate, and magnesium phosphate (MgHPO$_4$).

6. A powder mixture as in claim 5 wherein the alkali-insoluble compound is magnesium oxide.

7. A powder mixture as in claim 6 wherein the magnesium oxide has a bulk density of at least 0.2kg/dm$^3$.

8. A powder mixture as in claim 7 wherein the magnesium oxide has a bulk density greater than 0.8kg/dm$^3$.

9. A powder mixture as in claim 2 wherein the additive comprises a mixture of magnesium oxide and magnesium sulfate.

10. A powder mixture as in claim 9 wherein the additive mixture comprises about 10% by weight of the total powder mixture.

11. A mixture as in claim 10 wherein the magnesium sulfate comprises from 0.1 to 5% by weight of the total mixture.

12. A mixture as in claim 11 wherein the magnesium sulfate comprises from 1 – 2% by weight of the total mixture.

13. A method for producing lead storage battery tubular electrodes which comprises:
   a. placing a tubular sheath over an electrical conductor element;
   b. filling the space between the conductor and the sheath with a powdered isovolumetric mixture containing lead, lead oxide, and at least two non-lead additive compounds, at least one of said compounds comprising a metal oxide or salt which is very slightly soluble in alkaline solution but is capable of reacting with sulfuric acid to produce a readily soluble sulfate; and
   c. forming the electrode by subjecting the filled sheath to charging while immersed in an electrolyte.

14. A method as in claim 13 wherein the alkali-insoluble compound is a member of the group consisting of magnesium oxide (MgO), magnesium carbonate (MgCO$_3$), magnesium phosphate (Mg$_3$(PO$_4$)$_2$), and magnesium phosphate (MgHPO$_4$).

15. A method as in claim 13 wherein the sheath is filled with a powdered mixture of lead, lead oxide, and magnesium oxide, said magnesium oxide having a bulk density greater than 0.8 kg/dm$^3$ and constituting about 25% by weight of the total powder mixture.

16. A method as in claim 13 wherein the additive comprises a mixture of magnesium oxide and magnesium sulfate.

* * * * *